United States Patent [19]
Edwards

[11] Patent Number: 5,865,535
[45] Date of Patent: Feb. 2, 1999

[54] DYNAMIC MIXER CONTROL IN PLASTICS AND RUBBER PROCESSING

[75] Inventor: Daniel C. Edwards, Evergreen, Colo.

[73] Assignee: M.A.HannaRubberCompounding, a division of M.A. Hanna Company, Burton, Ohio

[21] Appl. No.: 965,307

[22] Filed: Nov. 6, 1997

[51] Int. Cl.⁶ .................................................. B29B 7/28
[52] U.S. Cl. ............................................ 366/76.7; 366/601
[58] Field of Search .................................. 366/76.1, 76.2, 366/76.6, 76.7, 76.8, 77, 79, 83–85, 96–99, 69, 91, 140, 297–301, 318, 601; 425/204, 208, 209; 364/528.1, 528.34

[56] References Cited

U.S. PATENT DOCUMENTS

| | | |
|---|---|---|
| 3,447,201 | 6/1969 | Seanor et al. . |
| 3,951,389 | 4/1976 | Porter .......................................... 366/91 |
| 3,999,046 | 12/1976 | Porter . |
| 4,076,220 | 2/1978 | Nakashima et al. ................. 366/601 X |
| 4,443,110 | 4/1984 | den Otter . |
| 4,455,091 | 6/1984 | Bamberger et al. . |
| 4,515,545 | 5/1985 | Hinrichs et al. . |
| 4,818,113 | 4/1989 | Patel . |
| 4,843,576 | 6/1989 | Smith et al. ........................ 364/528.34 |
| 5,149,193 | 9/1992 | Faillace ............................... 364/528.34 |
| 5,259,670 | 11/1993 | Brown . |
| 5,324,107 | 6/1994 | Tanaka et al. ....................... 366/601 X |

FOREIGN PATENT DOCUMENTS

| | | | |
|---|---|---|---|
| 4037028 | 5/1992 | Germany ............................... 366/601 |
| 59-142125 | 8/1984 | Japan ......................................... 366/84 |
| 2 084 035 | 7/1982 | United Kingdom . |
| 2 163 061 | 2/1986 | United Kingdom . |

Primary Examiner—Charles E. Cooley
Attorney, Agent, or Firm—Jones, Day, Reavis & Pogue

[57] ABSTRACT

A simple and efficient process and automated system is provided for controlling the mixing of polymeric material and additive materials in an internal mixer to provide quality products and batch to batch product uniformity. Real time mixing temperature profiles of a plurality of good quality batches of the same product are developed. The profiles are then superimposed or averaged to produce a real time temperature curve with maximum and minimum temperature tolerance limits, thus providing a range of batch temperatures that are allowable in real time during the mixing cycle. A process control system is programmed to store the range of allowable temperatures and to signal a mixer control to change at least one of the rotor speed and the ram pressure when the real time batch temperature falls outside the reference temperature range for a predetermined period of time.

6 Claims, 6 Drawing Sheets

DYNAMIC MIXER CONTROL IN PLASTICS AND RUBBER PROCESSING

BACKGROUND OF THE INVENTION

Internal or closed batch mixers have been commercially available for many years for mixing polymeric materials, such as plastics and rubber materials. The quality of the plastic or rubber products produced in the mixer is significantly influenced by mixing process parameters that are inherently variable, such as fluctuations in the mixer temperature, the cooling water temperature, the material feed temperature, the ram pressure, the rotor speed, the time of mixing, the fill level, the speed of the fill, and the like. These variations in the mixing process parameters influence the ejection temperature and mixing time, as well as the filler dispersion, viscosity, elasticity, homogeneity and percentage cure in the product. Poor mixing that leads to poor dispersion of filler particles, especially in rubber materials, can result in reduced product life, poor performance during service, poor product appearance, poor processing characteristics, and poor batch-to-batch product uniformity.

When batch mixers were introduced, control of the mixing operation to achieve satisfactory mixing was left almost entirely to the skill of the operator. However, instrumentation of batch mixers has been improved so that the information available to the operator to aid in control of mixing has increased and some automatic control has been introduced. For example, one proposed system would control the timing of addition of materials to the mixer, of raising of the plunger (ram) and of ejection of the load at predetermined "energy marks" based on a correlation between a superimposed desired or actual value control of the mixing temperature via the specific energy supplied to the mixer. Such a system proposes to eliminate differences in mixing qualities in the first charges of materials to the mixer on starting with a cold machine and during subsequent operation, as well as between summer and winter operation where there are significant differences in ambient factory temperatures.

Another proposed control system describes a process for mixing a polymer until it is estimated to attain a predetermined viscosity by measuring mixer rotor torque (corrected to a reference batch temperature) at a fixed rotor speed, determining the rate of change of torque, predicting the time to reach the predetermined viscosity by extrapolation, and thereafter continuing the mixing operation for the predicted time. A similar system measures the reaction torque experienced by the rotors and, in terms of a known relationship between torque and viscosity, assesses the relative Theological state of the compound in real time and adjusts the levels of kinetic and thermal energy inputs in order to achieve a predetermined value of viscosity on discharge. Problems exist, however, with each of these systems. For example, many compounds that are stiff or have high viscosity do not form a continuum within the mixer at the start of the mixing cycle and the initial process is inherently chaotic, with the result that the relationship between torque and viscosity cannot be defined with certainty. Moreover, the latter method involves the use of rotor torque as a measure of viscosity, viscosity as a measure of rheology, rheology as a measure of processability, and processability as a measure of extrudability. The relationship between rotor torque and extrudability is thus long and inherently inaccurate.

Many proposed systems attempt to control the whole mixing cycle automatically from the beginning. However, as described above, the problems in usefully controlling the mixing operation precisely during the initial, ingredient feeding stage are complex and these control systems are not very effective. For example, the various ingredients (in the case of rubber, carbon black, oil, fillers, curatives, antioxidants, etc.) are added to the mixer in a relatively short space of time which may be insufficient to operate the mixer to compensate for external variable factors, such as ambient factory temperatures, variation in feed stock, the quality of materials which, although nominally the same, are supplied by different manufacturers, and the temperature of the feed materials; and internal variable factors, such as the variable internal temperature of the mixer at the beginning of the mixing cycle after mixing of a previous batch, the cooling water temperature, the fill proportion, the speed of the fill, and the like.

Other proposed control systems attempt to control the mixing cycle only at a later stage, after all of the ingredients have been introduced to the mixing chamber and initially mixed. One such system monitors at least three mixing variables, such as the temperature of the mixed materials, the total power consumed, the time since the start of the mixing cycle, the torque applied to the rotors and the total number of revolutions of the rotors since the start of the mixing cycle. A series of complex equations relating these variables is then developed to produce target values at specified times during the mixing cycle for temperature and power, temperature and torque, temperature and rotor revolutions, rotor revolutions and torque, rotor revolutions and power, and torque and power. The system then changes the rotor speed and/or ram pressure at these specified times if the target values are not met. Because of the large number of different mixing parameters measured, this system is extremely complex for use during short mixing times after introduction of the materials, which for rubber processing are typically 1–3 minutes.

In view of the foregoing, there is still a need for a simple and efficient method for controlling parameters of the mixing process in order to produce polymer products having superior quality and uniformity from batch to batch.

SUMMARY OF THE INVENTION

The invention provides a simple and efficient process and automated system for control of the quality and batch to batch uniformity of polymer products, especially rubber products, in an internal mixer having at least one variable speed mixing rotor and a ram by which a variable pressure can be applied to materials in the mixing chamber. It has been discovered that a consistent batch to batch quality product can be obtained by real time control of the batch temperature, within an allowable temperature range, during the mixing cycle. The process, termed "dynamic mixing control", is particularly successful when used in conjunction with an automatic mixer control system that eliminates mixing time and/or temperature variations induced by variations between operators in performing mixing-related functions.

According to the invention, real time mixing temperature profiles of a plurality of good quality batches of identical product are developed. The profiles are then superimposed or averaged to produce a real time temperature curve with maximum and minimum temperature tolerance limits to establish a range of batch temperatures that are allowable in real time during the mixing cycle. By controlling the real time batch temperature within the predetermined allowable range, subsequent batches of the same product are produced that have substantially the same quality with batch to batch uniformity.

By the invention, a process control system is in electronic communication with the rotor(s) and the ram for sensing and controlling the rotor speed and the ram pressure. A temperature sensor in the mixing chamber, in electronic communication with the process control system, continuously transmits an electronic signal representing the real time batch temperature in the mixer. The process control system is programmed to store the predetermined reference temperature range representing the range of allowable real time batch temperature values during the mixing cycle, to receive the transmitted signal from the temperature sensor, to compare the received temperature value to the stored reference range, to indicate an acceptable temperature when the received batch temperature value falls within the reference range, and to signal the mixer control system to change at least one of the rotor speed and the ram pressure when the received temperature value falls outside the reference temperature range for a predetermined period of time.

The dynamic mixing control of the invention achieves excellent product quality control during very short mixing cycles without requiring the complex measurements, calculations and mixing parameter interrelationships of previous systems. Moreover, the invention provides real time control of the batch temperature during the remainder of the mixing cycle after dynamic mixing control is activated, rather than control at only discrete time intervals during the cycle. Substantially identical batches of product produced by the process of the invention show a consistently narrower deviation from specification than batches of product produced without the dynamic temperature control system of the invention.

DETAILED DESCRIPTION OF THE INVENTION

Figure 1:
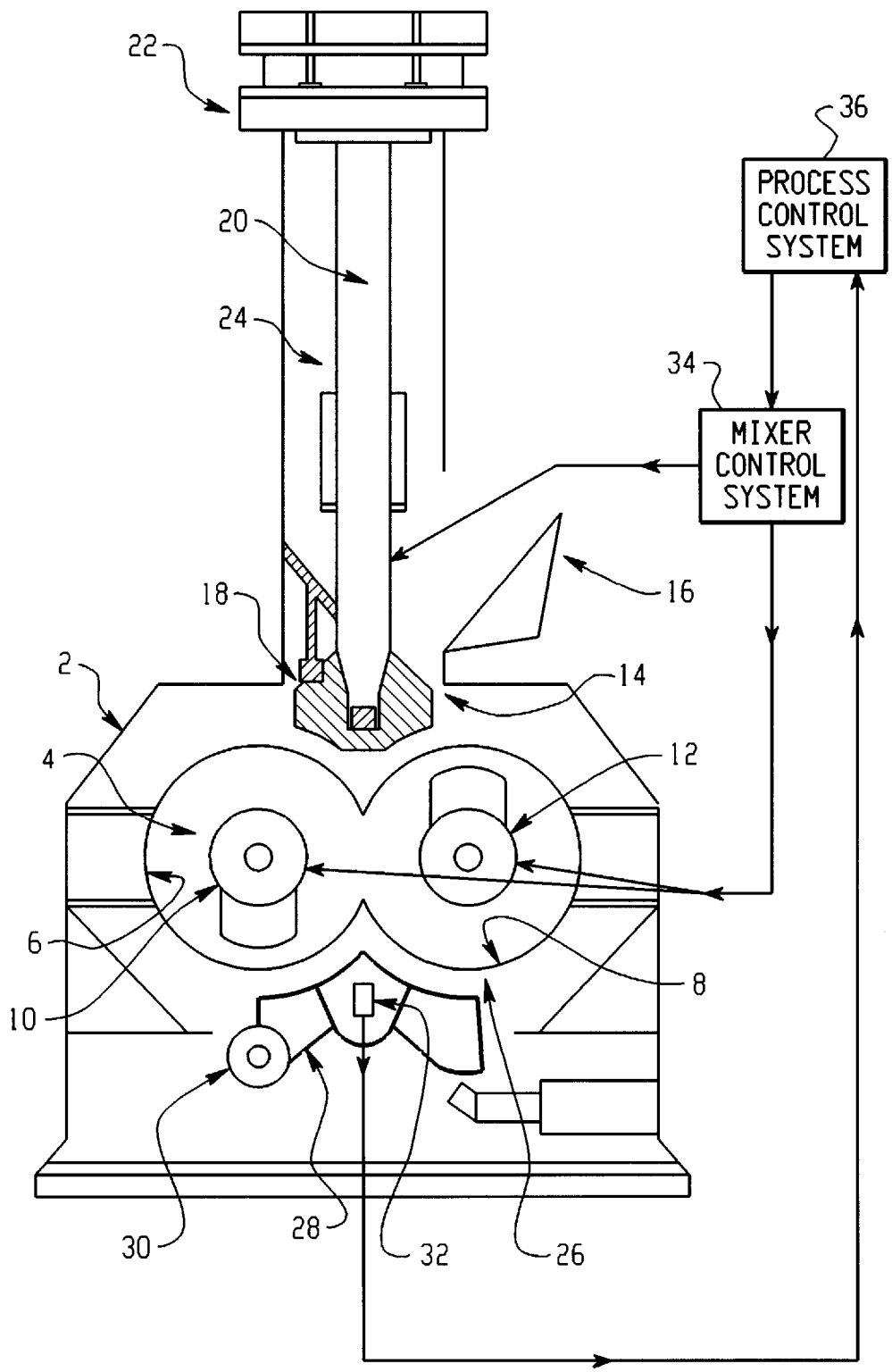
FIG. 1 is a schematic illustration of an internal mixer, such as a Banbury™ mixer, in which the dynamic mixing control system of the invention may be practiced.

The dynamic mixing control system and process of the invention is described below as it applies to rubber compounding. However, the process is not limited to rubber compounding and may be used to control the quality and batch to batch uniformity of any polymer product that employs an internal mixer for mixing of polymers and additives. For example, polymers such as polyamides, polyethylene, polypropylene, acrylonitrile butadiene styrene and polycarbonate may be compounded in an internal mixer employing the dynamic mixing control system and process of the invention.

Intermediate polymer and rubber compounded products are manufactured by the polymer or rubber processor according to the different requirements and specifications of each customer. By varying the mixture of compounding ingredients, a wide variety of practical plastic and rubber intermediate products can be produced, each customized to the customers' needs. Thus, virtually thousands of different recipes for compounding mixtures exist for producing thousands of different plastic or rubber products. To assure the quality of the product and the uniformity of the product from batch to batch, mixing parameters and chemical composition must be carefully controlled.

The major piece of equipment used in rubber compounding is an internal batch mixer, an example of which is a Banbury™ mixer (Farrel Bridge Limited, Rochdale, UK) described in detail in U.S. Pat. No. 4,818,113. In general, an internal mixer, as schematically illustrated in cross-section in FIG. 1, has a housing 2 in which is formed a mixing chamber 4 having a generally "figure 8" shaped cross-section comprising two joined parallel cylindrical portions 6, 8. At least one, and usually two rotors 10, 12 are mounted for rotation about parallel axes which lie in a horizontal plane, the rotor 10 being mounted in the cylindrical portion 6 and the rotor 12 being mounted in the cylindrical portion 8, each with its axis of rotation co-axial with the axis of the respective cylindrical portion. The rotors 10, 12 have any suitable configuration and the present invention is applicable to internal batch mixers having any rotor configuration. The rotors 10, 12 are rotated in opposite directions and may have the same rotational speed or slightly different rotational speeds. The speed of the rotors is variable and is governed by a mixer control system 34 which also governs other mixing parameter variables, as described further below.

The mixer has one or more inlet openings 14 through the housing to the mixing chamber, such as hopper 16 disposed between the two cylindrical portions, for delivering rubber and additives, such as carbon black, oil, fillers, curatives, antioxidants, etc. into the mixing chamber 4. A closure member, provided by a ram 18 is arranged to close the inlet opening(s) in the operation of the mixer. The ram 18 is mounted at the lower end portion of a piston rod 20 of a piston and cylinder 22 arrangement for sliding movement in a passage 24 opening into the mixing chamber. When the ram is raised to an uppermost position by the admission of pressurized fluid, usually air, to the cylinder 22, the materials to be mixed may be introduced through one or more openings, such as hopper 16 and inlet opening 14, into the mixing chamber 4. When the materials to be mixed have been introduced into the mixing chamber 4, the ram is lowered under controlled pressure to the cylinder 22, and the air pressure together with the weight of the ram 18 urge the ram 18 downwardly to push the materials to be mixed into the mixing chamber.

As the rotors 10, 12 rotate in the operation of the mixer, material in the mixing chamber 4 exerts considerable upward force on the ram 18, which is opposed by a downward force provided by the air pressure in the cylinder 22. The pressure imposed by the ram 18 on the material in the mixing chamber 4 has an influence on the mixing and homogenization of the materials in the mixing chamber.

Because of the nature of the design of the rotors, the force exerted on the ram by the material in the mixing chamber fluctuates considerably. The ram pressure is also governed by the mixer control system 34.

The mixer further has an outlet opening 26 from the mixing chamber 4 from a lower part of the housing 2, also centrally disposed between the two cylindrical portions 6, 8 of the mixing chamber. At the outlet opening 26, there is a closure member called a drop door 28 mounted for pivotal movement about an axle 30 in the housing. In FIG. 1, the drop door 28 is shown in a closed position by which it seals the outlet opening 26 against the escape of material from the mixing chamber 4 during mixing.

Some control of the temperature of the mixer walls in the areas of the rotors, the ram and/or the drop door may be provided by passing heat exchange fluid (usually water) through passages (not shown) in the housing 2 and possibly other parts of the mixer. The temperature of the cooling fluid is predetermined at the beginning of the mixing cycle and usually remains substantially constant throughout a mixing cycle.

In the initial stages of the compounding of rubber in an internal batch mixer, such as that described above, bales of rubber, pelletized carbon black and other ingredients are charged into the mixing chamber where the mechanical action of the rotors, as modified by ram pressure and wall temperatures, causes changes in the physical state of the rubber and carbon black. In the first stages, large bales of rubber are broken down and torn into small, relatively cold and stiff chunks by the mechanical action of the rotor and friction between the rotors and the bale. The reduction in rubber size is termed comminution. Next, the mechanical action of the rotors, coupled with heat transfer from the mixer walls and hot rubber already in the mixer, raises the rubber temperature and breaks it down so that the rubber becomes plasticated and capable of flowing like a fluid. At the same time the rubber is being comminuted and ingested into the mixer, carbon black and other ingredients, such as oils and fillers, are being incorporated into the rubber. Incorporation of carbon black into rubber in the compounding process involves distinct phases, (i) incorporation, (ii) distribution, and (iii) dispersion. During incorporation, carbon black pellet fragments or large agglomerates are initially engulfed by the rubber. In the distribution phase the agglomerates are randomly distributed throughout the mass of the mixture. There is also a rapid breakage or rupture of large agglomerates into smaller ones as a result of internal stresses induced by viscous drag on the agglomerates. During the dispersion phase, the agglomerates become reduced in size and number under the shearing action of the rotors, with the formation of essentially colloidally dispersed aggregates in the liquid rubber.

The mixing times in rubber compounding are short, often ranging from 3 to 5 minutes. The time from carbon black addition to ejection (drop) of the mixed load from the mixer is even shorter, often ranging from 1 to 3 minutes. Because of the short mixing times, the quality of dispersion of carbon black and other fillers in the rubber is dependent on selectable parameters in the mixer, e.g., rotor speed (rpm), ram pressure, rotor temperature, temperature inside the mixer, temperature of the mixer walls, size of the batch, mixing time and the order in which the ingredients are charged into the mixer, as well as the chemical composition of the batch and the grade of the carbon black used. Quality control of the product is thus dependent upon the selection of the proper mixing parameters and the chemical composition of the batch, both of which control the quality of the dispersion of the fillers.

Of the above mixing parameter variables, the temperature of the mixer walls (governed by the coolant temperature), the size of the batch, the order in which the ingredients are charged into the mixer, and the chemical composition of the batch are known by the operator at the beginning of the mixing cycle. Parameters which can be changed during the mixing cycle are the rotor speed and the ram pressure, which in turn govern the temperature of the batch of material inside the mixing chamber. In general, as the rotor speed and the ram pressure increase, the batch temperature increases. Conversely, as the rotor speed and ram pressure decrease, the batch temperature decreases. Control of the batch temperature is important because at least some of the materials to be mixed are usually subject to degradation or scorching by exposure to too much heat. On the other hand, the batch temperature must be high enough to provide fluidity or plasticity to the material for proper dispersion of fillers and other materials.

Other parameters which can be changed during the mixing cycle include the times, temperature or accumulative KWH (kilowatt hours) at which materials (e.g. oil, carbon black, fillers) are added to the mixer, the times of and duration of "sweeping" (cleaning of debris from) the ram, and the like.

As illustrated in FIG. 1, the system of the invention comprises a temperature sensor 32 for measuring the real time temperature of the batch in the mixing chamber 4 during the mixing cycle and is located at any convenient position within the mixing chamber, such as near the drop door 28. A process control system 36, which is preferably a logic controller, and more preferably a microprocessor, is in electronic communication with at least the temperature sensor 32 and the mixer control system 34, and is capable of signalling the mixer control system to change the ram pressure and the rotor speed. The mixer control system 34 is preferably an automated system programmed to store various mixing cycle parameters, such as times and conditions for introduction of various materials, preset wall temperatures, rotor speeds and ram pressures at the beginning of and during the mixing cycle, times and durations of sweeping the ram, and the like. The mixing parameters are initially determined and entered into the mixer control memory by a person knowledgeable in the operation of mixing. The mixer control is thus programmed to issue procedural instructions based on absolute time, relative time, temperature, and energy input, during the mixing cycle.

In conjunction with the mixing control system, the dynamic mixing control system of the invention is concerned with keeping the temperature of the batch within a predetermined allowable temperature range in real time during the mixing cycle. The system thus acts to "fine tune" the mixing cycle. Although the dynamic mixing control can be used with a manually operated mixing cycle, it is preferable that the system be used in conjunction with an automated mixer control system, such as that described above. A reason for this preference is that when mixing parameters are manually controlled by an operator, variations in parameters, such as the duration of time for sweeping the ram, for example, can result in phase changes that influence mixing times and temperatures. For example, one operator may sweep for 10 seconds, whereas another operator may sweep for 40 seconds, resulting in a variation of 30 seconds in the phase of the mixing cycle between operators. The longer sweep time would also result in a lower batch temperature at that phase and a longer mixing time, but the finished batch might be satisfactory. However, if the dynamic mixing control system were in use during operator-controlled varied mix cycles, such as cycles with phase differences, it would continually attempt to compensate for resulting temperature variations to keep the batch temperature within the allowable maximum and minimum tolerance levels according to the real time of the mixing cycle. The result could be batches that, for example, have inadequate mixing times or unwanted temperature variations. If there is little or no variation between manual, operator-controlled mixing cycles, the dynamic mixing control of the invention may be used.

It has been discovered that the dynamic mixing control process of the invention achieves product quality and batch to batch uniformity by keeping the batch temperature within a predetermined temperature range from a predetermined period of time after the start of the mixing cycle until the end of the cycle. Moreover, because the temperature of the batch is controlled in real time based on historical temperature profiles for identical compositions, the mixing time for each batch of the composition is also consistent.

By the process of the invention, a selected number of experimental batches of a single composition are mixed to the client's specification according to the experience of the person knowledgeable in the operation of mixing. During mixing of each of the experimental batches, the temperature of the batch is monitored in real time and a real time profile of the batch temperature versus the time of mixing is established. After mixing is completed, the quality of each composition is determined by assessing one or more physical properties, such as viscosity (shear test), filler dispersion (tensile testing or particle dispersion analysis), rheology measurements, homogeneity, percentage cure, and the like.

Figure 2A:
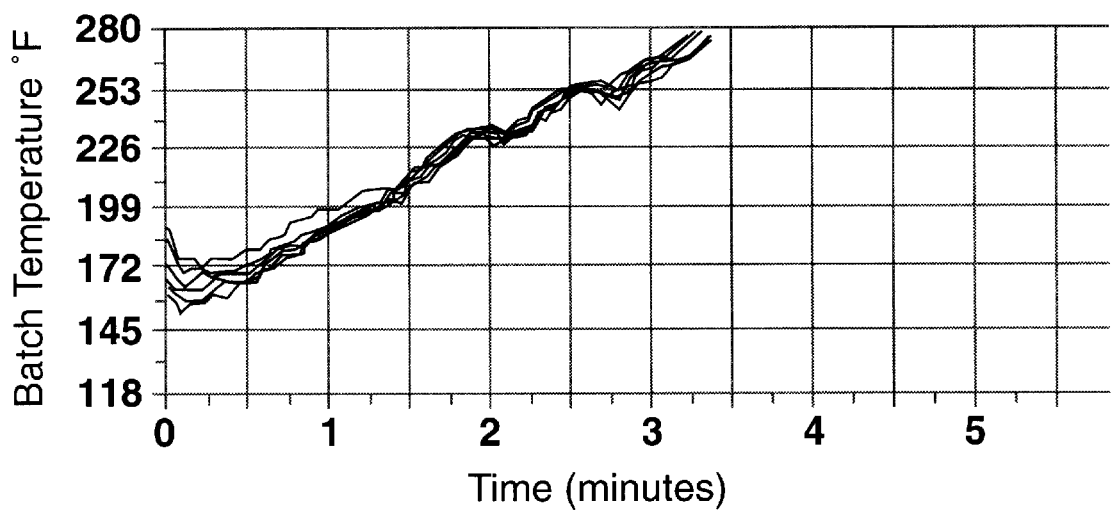
FIG. 2A is a graphical illustration of real time historical temperature profiles of different batches of the same compound.
Figure 2B:
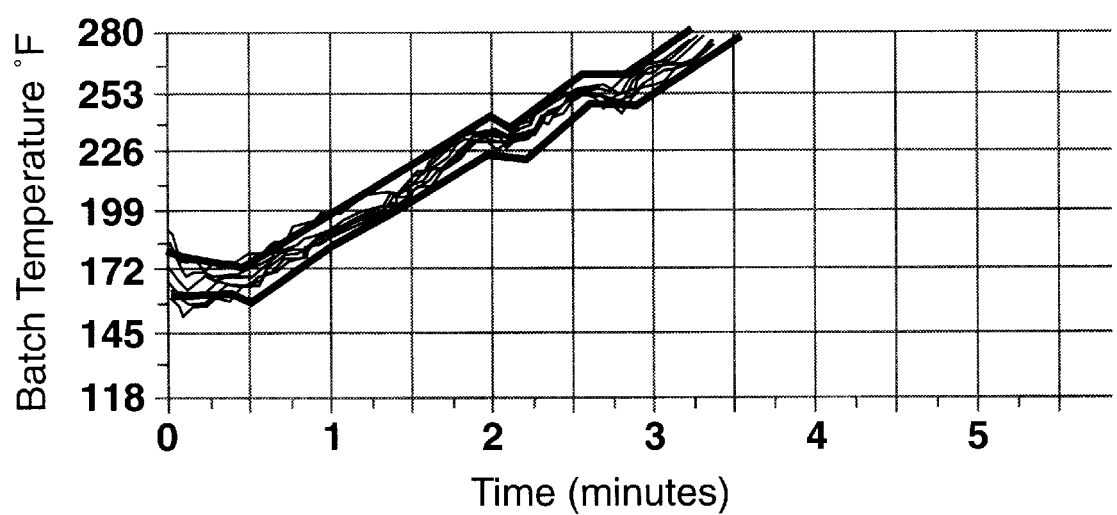
FIG. 2B is a graphical illustration of the real time temperature profiles of FIG. 2A with maximum and minimum temperature tolerance levels extrapolated therefrom.
Figure 3:
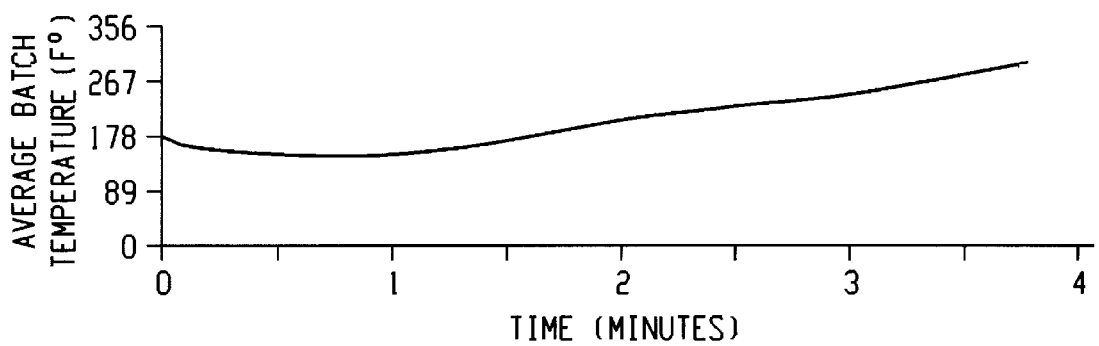
FIG. 3 is a graphical illustration of an average temperature profile derived from real time temperature profiles of different batches of the same compound.

In one embodiment of the invention, historical temperature profiles from consecutive previous batches (e.g. the last five batches) of the same composition are automatically selected and superimposed to form a trace, such as that illustrated in FIG. 2A. From the trace, real time maximum and minimum acceptable temperatures are established, as illustrated by the heavy lines in FIG. 2B. In a preferred embodiment of the invention illustrated in FIG. 3, the temperature profiles are selected from a number of previous batches that have been determined by a qualified chemist to have an acceptable mixing quality. These temperature profiles are then averaged to form a model temperature trace and a maximum and minimum deviation from the model temperature trace is calculated. In each of these embodiments, the established maximum and minimum temperature tolerances form a predetermined temperature range profile of allowable real time batch temperatures that is used in mixing each subsequent batch of the composition. The process control system is programmed with the established acceptable temperature range profile for mixing the particular composition. For mixing of subsequent batches of the composition, the process control system is programmed to signal the mixer control to increase one or both of the rotor speed and ram pressure when the batch temperature falls below the minimum allowed temperature of the temperature range for a predetermined period of time, and to decrease one or both of the rotor speed and ram pressure when the batch temperature is above the acceptable maximum allowed temperature of the temperature range for a predetermined period of time. In this manner, batch to batch uniformity of the mixing temperature is achieved, as well as substantial batch to batch uniformity in mixing times. It is known by those skilled in the art that the mixing time strongly influences the Mooney viscosity of the mixed compound. Therefore, mixing compounds with the dynamic mixing control of the invention, provides compounds having consistent Mooney viscosities, with the result that the products have essentially uniform quality from batch to batch.

The predetermined time for starting dynamic mixing control depends on the type of material to be compounded. For example, the batch temperature is not homogeneous at the start of the mixing cycle when stiff or highly viscous components, such as natural rubber, are employed. For these types of materials, dynamic mixing control start time would be delayed until a time after the start of the mixing cycle. For components with a low viscosity, such as materials undergoing a second mixing cycle in the mixer, the dynamic mixing control could be started at the beginning of the mixing cycle. One skilled in the art of mixing is capable of determining a proper start time for the dynamic mixing control according to the materials to be mixed without undue experimentation.

Figure 4:
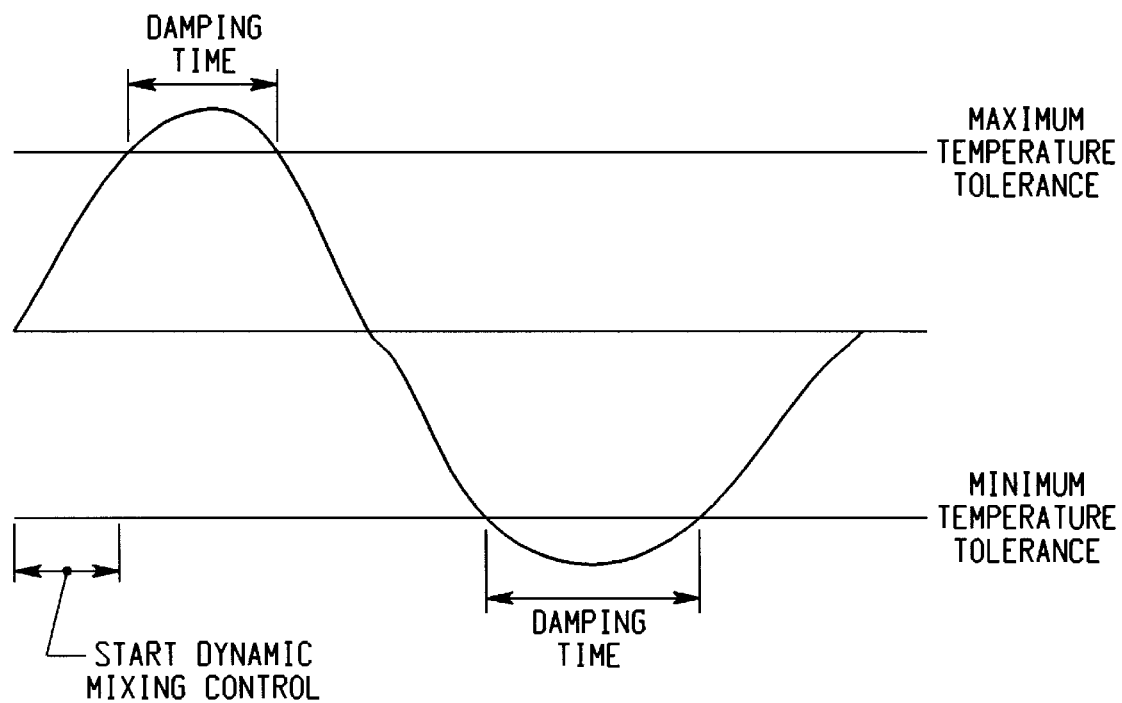
FIG. 4 is a schematic illustration of the dynamic mixing control process.

The dynamic mixing control of the invention is illustrated in FIG. 4. The process control system is programmed with at least six dynamic control parameters, as follows: (i) the "damping time", which is the time (in seconds) allowed out the temperature tolerance zone before the rotor speed and/or ram pressure correction is applied. The damping time is useful to prevent the dynamic control system from overcompensating for a temporary surge or drop in temperature that would otherwise self-correct. Damping times for temperatures above the maximum tolerance range and below the minimum tolerance range may be the same or may be different from each other. The damping time may be 0 to about 9 seconds, but is preferably about 1 to about 6 seconds and more preferably about 2 to about 4 seconds; (ii) the "temperature zone", which is bounded by the maximum and minimum temperature tolerance limits, preferably expressed as a standard deviation (+/−) from the model temperature trace; (iii) the dynamic control start time, which is the time (in seconds) at which to start dynamic control during the mixing cycle; (iv) the amount of change to be applied to the rotor speed (in RPM) and/or the ram pressure (in PSI) after the damping time has elapsed; (v) the maximum RPM correction to be allowed; and (vi) a yes/no dynamic control selection as to whether or not dynamic mixing control will be applied on this run.

An exemplary batch mixing cycle employing dynamic mixing control is illustrated as follows. The damping time is set to 2 seconds (in this case the maximum and minimum out of tolerance damping times are the same), the temperature tolerance zone is set to +/−5° F., the dynamic mixing control start time is set to 60 seconds, the maximum RPM correction to be allowed is set to 6, the dynamic control is selected (yes). Since the dynamic mixing control start time is set to 60, dynamic control will not occur until 1 minute after the start of the mix cycle. If, after 1 minute into the dynamic control, the current instantaneous temperature profile falls outside and above the maximum temperature tolerance level, and stays above this level for a period of time that exceeds the 2 seconds damping time, a signal is sent to the mixer control system to adjust the RPM by −2 RPM. If the current instantaneous temperature profile falls outside and below the minimum temperature tolerance level, and stays below this level for a period of time that exceeds the 2 seconds damping time, a signal is sent to the mixer control system to adjust the RPM by +2 RPM. If the current instantaneous temperature profile is corrected to where it falls within the allowable maximum and minimum tolerance limits within another damping time period, no other correction is made. However, if the current temperature profile stays outside of a tolerance limit, further cumulative RPM correction is applied until the curve returns to within the control zone or until the maximum RPM correction is reached, at which time no further correction is applied.

The following examples are illustrative of the process of dynamic mixing control of the invention. However, the examples are not intended to be limiting, as other internal mixers, batch ingredients, dynamic mixing control parameters, and the like, may be used.

EXAMPLES

Example 1

Dynamic mixing control was evaluated with two different compounds to assess its effect on mix consistency. The selected compounds were neoprene, with and without the addition of a curing compound, and polyisoprene with the addition of a curing compound. Sixty batches of the neoprene and 15 batches of the polyisoprene were prepared in the same mixer. Approximately half of the batches were prepared with dynamic mixing control and compared with the remaining batches prepared without dynamic mixing control. Each batch was subjected to measurement of the following physical properties:

Measured Property Significance of Property to Mix Cycle
Mooney Viscosity—Related to consistency of mix time.
Mooney Scorch—Related to consistency of heat history, specifically drop temperature.
Rheometer, MH—Maximum torque, related to consistency of cure dispersion.
Tensile—Related to consistency of carbon black dispersion.
Carbon Black Dispersion—Direct measure of carbon black dispersion using a particle dispersion imaging system.

There are several methods for particle dispersion image analysis known to those skilled in the art of plastics and rubber compounding and any of these systems is satisfactory for use in the present invention. The particle dispersion imaging system used in the present examples is the subject of U.S. patent application, Ser. No. 08/887,913 filed Jun. 30, 1997, the disclosure of which is hereby incorporated by reference. The latter patent application is owned by and assigned to the assignee of the present invention.

Figure 5A:
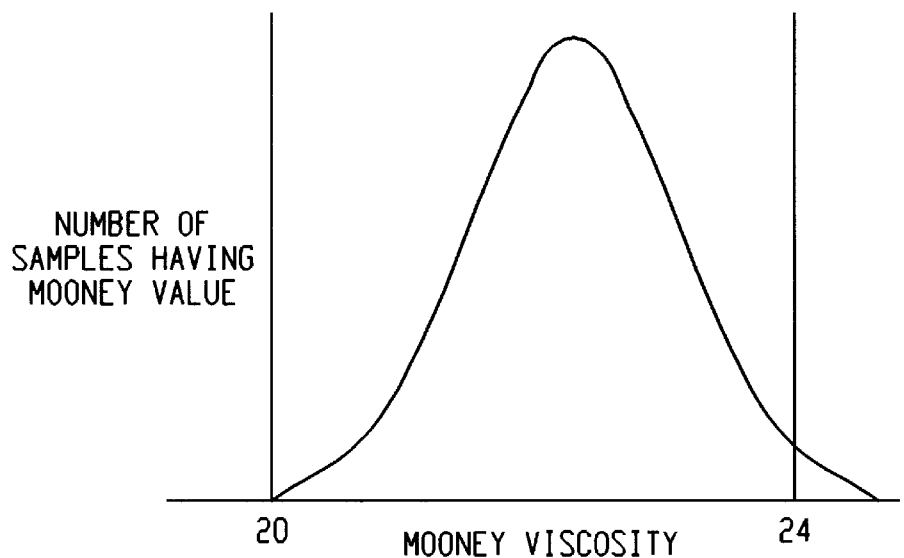
FIGS. 5A and 5B are graphical representations of the distribution of Mooney viscosity values of polyisoprene batches after mixing without and with the dynamic mixing control of the invention, respectively.
Figure 5B:
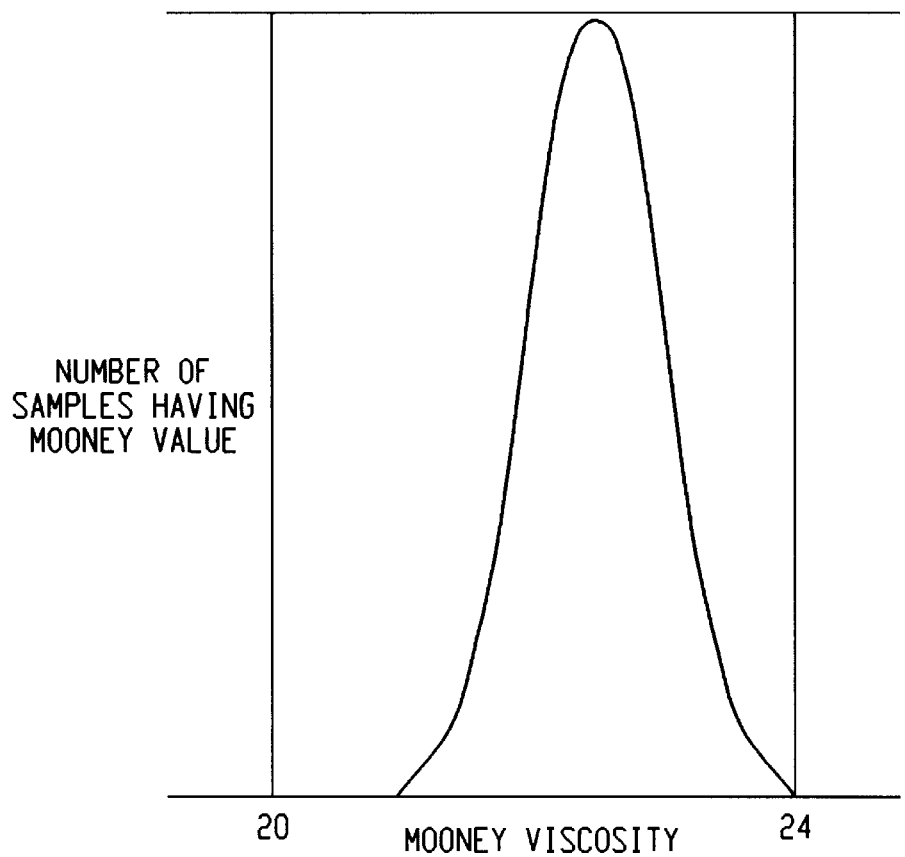

The results of the testing of the physical properties of the compounds are illustrated in Table 1 and FIGS. 5A and 5B. The data of Table 1 are presented as the standard deviation and the Cp between batches, with and without dynamic mixing control. Cp represents a statistical measurement of the consistency of the physical property measurement values between batches. For example, the lower the standard deviation, the higher the Cp. FIG. 5A is a plot of the distribution of Mooney viscosity values for the polyisoprene batches without using dynamic mixing control. FIG. 5B is a plot of the distribution of Mooney viscosity values for the polyisoprene batches with the use of dynamic mixing control.

The data of Table 1 illustrate that more consistent Mooney viscosity and Rheometer maximum torque (MH) values are achieved between batches when dynamic mixing control is used. The graphs of FIGS. 5A and 5B further illustrate the narrower range of Mooney viscosities achieved when dynamic mixing control is applied. Since viscosity is influenced by mixing time, the results show that the dynamic mixing control maintains a consistency in mixing time between batches.

Rheometer MH (state of cure) is a measure of cure dispersion which occurs in the latter stages of the mixing cycle after cure addition. The results show that mixing with dynamic mixing control maintains a consistent mixing time after cure addition and provides a more consistent cure dispersion between batches. The Mooney scorch test is influenced by the temperature at drop of the batch. As expected, the dynamic temperature control does not influence the drop temperature. Carbon black dispersion occurs in the earlier stages of the mix cycle. Since dynamic mixing does not significantly influence the early stages of mixing, it appears to have little effect on carbon black dispersion, as measured by tensile strength and direct image analysis of dispersion.

TABLE 1

| Compound | Physical Property | Standard Deviation Without Dynamic Mixing Control | Standard Deviation With Dynamic Mixing Control | Cp Without Dynamic Mixing Control | Cp With Dynamic Mixing Control |
|---|---|---|---|---|---|
| Neoprene Without Cure | Mooney Viscosity | 3.7 | 5.2 | 1.49 | 1.08 |
| Neoprene With Cure | Mooney Viscosity | 1.1 | 0.4 | 1.59 | 2.73 |
| | Mooney Scorch | 0.9 | 0.8 | 1.16 | 1.04 |
| | Rheometer MH | 2.4 | 0.9 | 1.33 | 3.50 |
| | Tensile | 42.6 | 59.5 | 1.14 | 0.72 |
| Polyisoprene | Mooney Viscosity | 1.9 | 0.3 | 1.33 | 7.73 |
| | Mooney Scorch | 1.3 | 1.2 | 1.33 | 1.47 |
| | Rheometer MH | 2.2 | 1.5 | 1.33 | 1.92 |
| | Tensile | 119.6 | 62.7 | 1.33 | 2.54 |

| | With Dynamic Mixing Control | Without Dynamic Mixing Control |
|---|---|---|
| Total Particle Counts | 78 | 84 |
| Average Particle Size | 19 | 19 |
| Total Undispersed Area | 1490 | 1590 |

Example 2

Two different compositions comprising raw materials for rubber compounding were selected by polymer type and physical property requirements. Styrene butadiene rubber (SBR) was selected to determine the effect of dynamic mixing control on SBR compounds and its ability to control scorch, as measured by Ts2 on a rheometer. Acrylonitrile butadiene rubber (NBR) was selected to determine the effect of dynamic mixing control in controlling the Mooney viscosity of a variable Mooney viscosity compound.

Forty-four batches of the SBR composition were prepared in the same mixer. Of these, half were prepared with dynamic mixing control and half were prepared without dynamic mixing control. The mix times of the batches prepared with dynamic mixing control ranged from 3 minutes and 34 seconds to 3 minutes and 56 seconds; whereas the mix times of the batches prepared without dynamic mixing control showed a slightly greater variation, from 3 minutes and 39 seconds to 3 minutes and 59 seconds.

Thirty-three batches of the NBR composition were prepared. Of these, twelve were prepared with dynamic mixing control and twenty-one were prepared without dynamic mixing control. The mix times of the batches prepared with dynamic mixing control ranged from 3 minutes and 13 seconds to 3 minutes and 47 seconds; whereas the mix times of the batches prepared without dynamic mixing control showed a slightly greater variation, from 3 minutes and 6 seconds to 3 minutes and 49 seconds. The results of rheometry testing of the compounds, given in Table 2, illustrate that the use of dynamic mixing control reduces variations between batches in Mooney viscosity and rheometer scorch results (Ts2).

Figure 6A:
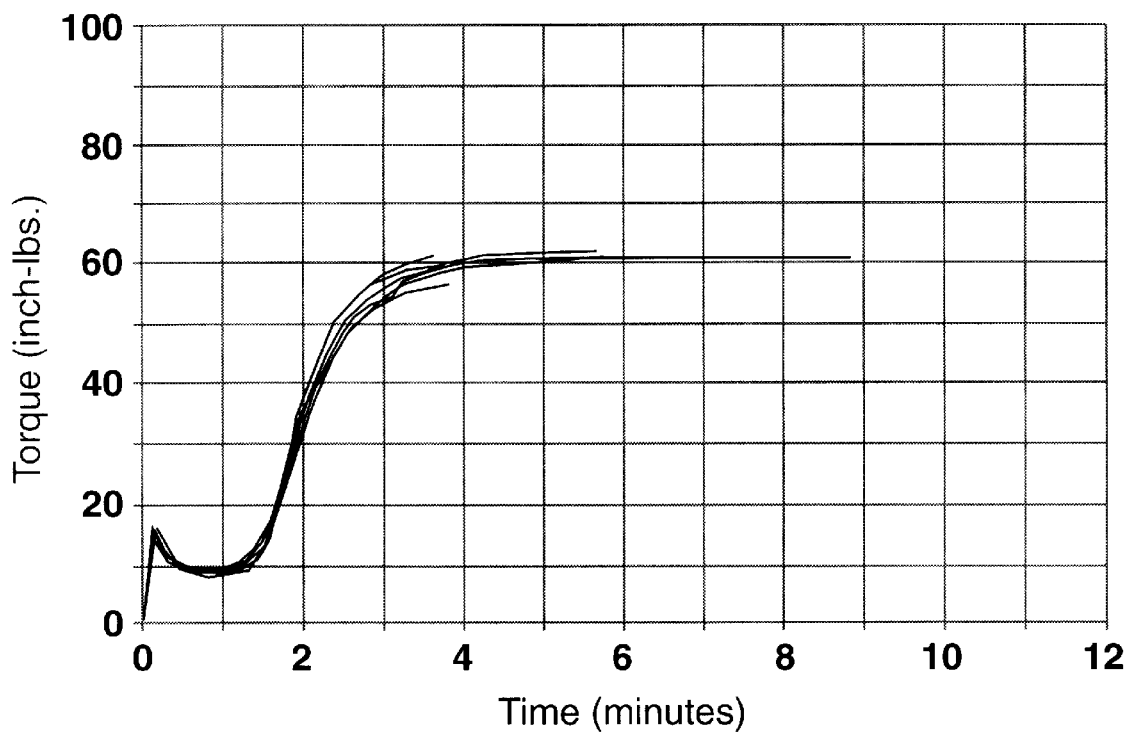
FIGS. 6A and 6B are rheometric profiles of identical batches of styrene butadiene rubber after mixing without and with the dynamic mixing control of the invention, respectively.
Figure 6B:
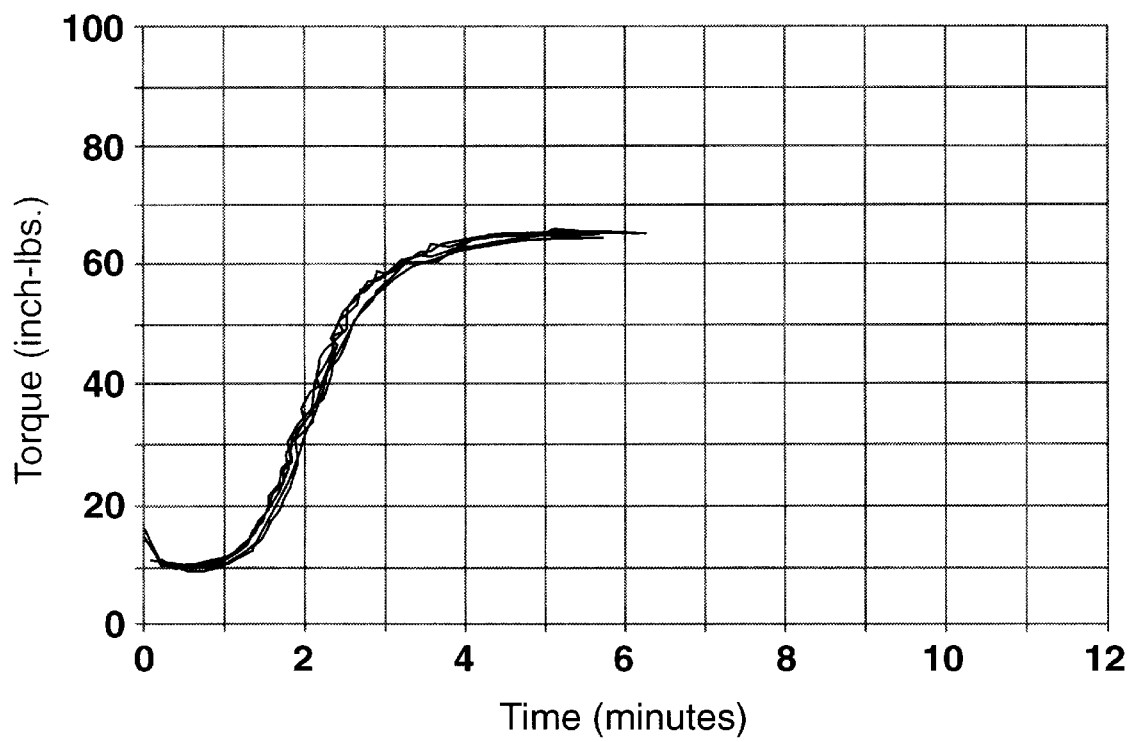
Figure 7A:
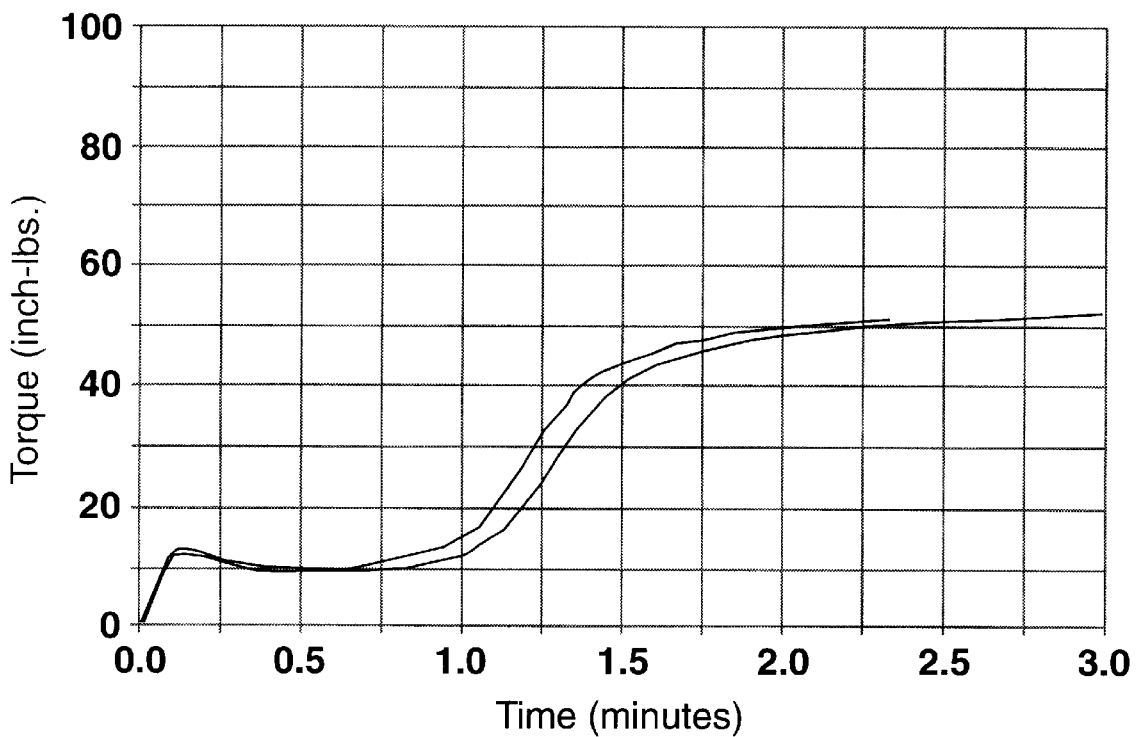
FIGS. 7A and 7B are rheometric profiles of two identical batches of acrylonitrile rubber after mixing without and with the dynamic mixing control of the invention, respectively.
Figure 7B:
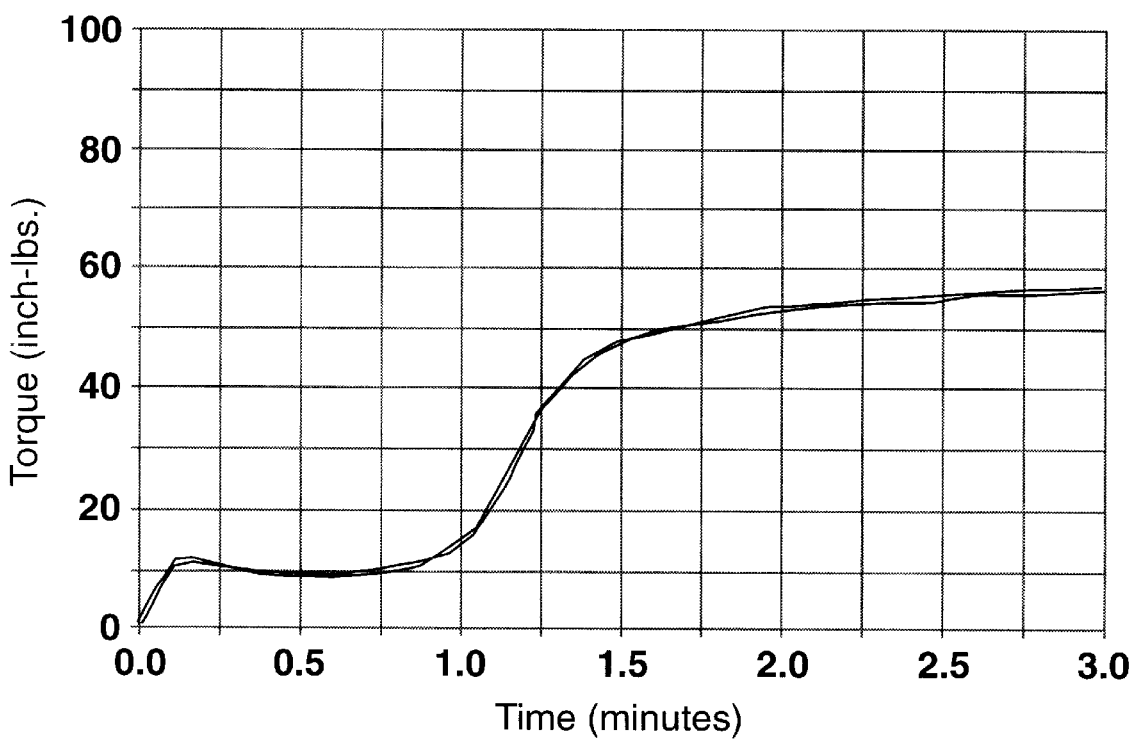

Actual rheometer tests results for representative batches of the SBR and NBR compounds are given in Tables 3 and 4, respectively. The results are graphically illustrated in FIGS. 6A and 6B for SBR and in FIGS. 7A and 7B for NBR, respectively. These results illustrate a considerable reduction in the "fanning effect" at the end of the rheometer curves when dynamic mixing control is used, showing a tighter control of the maximum torque. There was also a tighter control of all measured properties (minimum torque, maximum torque, Ts2 and Tc90) when dynamic mixing control was used.

TABLE 2

| Compound | Physical Property | Standard Deviation Without Dynamic Mixing Control | Standard Deviation With Dynamic Mixing Control | Cp Without Dynamic Mixing Control | Cp With Dynamic Mixing Control |
|---|---|---|---|---|---|
| SBR* | Mooney | 2.211 | .873 | 0.985a | 2.48a |
|  | Scorch (Ts2) | .0824 | .0409 | 1.62 | 3.26 |
| NBR** | Mooney | 3.625 | 2.583 | .92 | 1.29 |

*SBR = Styrene Butadiene Rubber
**NBR = Acrylonitrile Butadiene Rubber
aBased on an assumed Mooney specification of 35–48.

TABLE 3

| Batch* Number | Minimum Torque | Maximum Torque | Ts(2)** | Tc(90)*** |
|---|---|---|---|---|
| Without Dynamic Mixing Control | | | | |
| 1 | 8.10 | 61.98 | 1.28 | 2.88 |
| 2 | 7.84 | 56.98 | 1.38 | 2.83 |
| 3 | 7.91 | 58.06 | 1.27 | 2.72 |
| 4 | 7.91 | 61.16 | 1.27 | 3.05 |
| 5 | 7.97 | 59.83 | 1.27 | 2.83 |
| 6 | 8.73 | 60.78 | 1.30 | 3.20 |
| 7 | 9.17 | 60.91 | 1.25 | 3.15 |
| 8 | 8.85 | 60.15 | 1.25 | 2.95 |
| 9 | 9.11 | 61.60 | 1.25 | 2.78 |
| 10 | 8.41 | 60.34 | 1.30 | 2.95 |
| With Dynamic Mixing Control | | | | |
| 11 | 8.73 | 60.46 | 1.23 | 3.00 |
| 12 | 9.04 | 59.96 | 1.22 | 2.93 |
| 13 | 8.85 | 59.89 | 1.22 | 3.00 |
| 14 | 8.79 | 61.54 | 1.22 | 3.20 |
| 15 | 8.79 | 60.21 | 1.30 | 3.25 |
| 16 | 8.66 | 59.83 | 1.25 | 2.97 |
| 17 | 9.11 | 60.15 | 1.15 | 3.15 |
| 18 | 8.92 | 61.98 | 1.25 | 3.15 |
| 19 | 8.92 | 61.09 | 1.35 | 3.40 |
| 20 | 8.85 | 60.34 | 1.28 | 3.30 |

*Styrene butadiene rubber
**Ts2 = The time it takes for the torque to increase 2 inch-pounds from the minimum (a measure of beginning of cure)
***Tc90 = The time it takes to reach 90% of total cure.

TABLE 4

| Batch* Number | Minimum Torque | Maximum Torque | Ts(2)** | Tc(90)*** |
|---|---|---|---|---|
| Without Dynamic Mixing Control | | | | |
| 1 | 9.25 | 52.25 | 0.92 | 1.93 |
| 2 | 10.18 | 51.38 | 0.87 | 1.70 |
| With Dynamic Mixing Control | | | | |
| 1 | 8.78 | 56.76 | 0.83 | 1.82 |
| 2 | 8.89 | 56.25 | 0.82 | 1.83 |

*Acrylonitrile butadiene rubber
**Ts2 = The time it takes for the torque to increase 2 inch-pounds from the minimum (a measure of beginning of cure)
***Tc90 = The time it takes to reach 90% of total cure.

Example 3

Identical batches of raw materials for rubber compounding were separately mixed in the same mixer. Dynamic mixing control was applied to some of the batches. Control batches did not have dynamic mixing control. The data of Tables 5 and 6 illustrate the base polymers and cure system and a comparison of the rheometric and other physical properties of the resulting products with and without dynamic mixing control. The data illustrate a tighter control of all parameters tested when dynamic mixing control was employed.

While the invention has been described herein with reference to the preferred embodiments, it is to be understood that it is not intended to limit the invention to the specific forms disclosed. On the contrary, it is intended to cover all modifications and alternative forms falling within the spirit and scope of the invention.

TABLE 5

| Dynamic Mixing | | Std. Dev. Without | Std. Dev. With | Cp Without | Cp With |
|---|---|---|---|---|---|
| Base Polymer | | EPDM** | | | |
| Cure System | | Sulfur | | | |
| Rheo | MI* | 0.16788 | 0.13595 | 3.604 | 3.678 |
|  | Ts2 | 0.07797 | 0.04068 | 2.197 | 4.097 |
|  | Tc50 | 0.08256 | 0.04675 | 2.030 | 3.565 |
|  | Tc90 | 0.08021 | 0.06211 | 2.231 | 2.683 |
|  | MH | 0.39083 | 0.22217 | 4.396 | 7.502 |
| Mooney Viscosity | | 0.61618 | 0.35201 | 4.015 | 4.735 |
| Scorch | | 1.48135 | 0.75232 | 1.284 | 2.658 |
| Tensile | | 100.95676 | 156.34473 | 1.877 | 0.863 |
| Base Polymer | | CPE*** | | | |
| Cure System | | Sulfurless | | | |
| Rheo | MI* | 0.19384 | 0.36936 | 1.71963 | 0.90246 |
|  | Ts2 | 0.04296 | 0.17196 | 2.71570 | 0.67845 |
|  | Tc90 | 0.26930 | 0.10148 | 0.62 | 1.61 |
|  | MH | 1.15705 | 0.90299 | 1.15236 | 1.47658 |
| Mooney Viscosity | | 1.01095 | 0.59397 | 2.45 | 4.21 |
| Base Polymer | | CPE*** | | | |
| Cure System | | Sulfurless | | | |
| Rheo | MI* | 0.21617 | 0.14772 | 1.54200 | 2.25652 |
|  | Ts2 | 0.06253 | 0.05095 | 1.865771 | 2.28983 |
|  | Tc90 | 0.09282 | 0.56221 | 1.79 | 0.30 |
|  | MH | 1.23492 | 1.44279 | 1.07970 | 0.92414 |
| Mooney Viscosity | | 0.54949 | 0.26000 | 4.55 | 9.62 |
| Tensile | | 63.40391 | 47.37615 | 0.799 | 1.759 |

TABLE 5-continued

| Dynamic Mixing | | Std. Dev. Without | Std. Dev. With | Cp Without | Cp With |
|---|---|---|---|---|---|
| | Base Polymer | Natural Rubber | | | |
| | Cure System | Sulfur | | | |
| Rheo | MI* | 0.35688 | 0.29187 | 1.03 | 1.26 |
| | Ts2 | 0.25606 | 0.24904 | 1.95 | 2.01 |
| | Tc90 | 0.23574 | 0.26718 | 1.77 | 1.56 |
| | MH | 1.07417 | 0.67803 | 1.40 | 2.21 |
| Mooney Viscosity | | 1.36508 | 2.92742 | 1.22 | 0.85 |
| Scorch | | 1.44579 | 0.73073 | 0.92 | 1.83 |
| Tensile | | 233.61697 | 122.40745 | 0.86 | 1.63 |
| | Base Polymer | NBR**** | | | |
| | Cure System | Sulfur | | | |
| Rheo | MI* | 0.44929 | 0.28036 | 2.22 | 3.57 |
| | Ts2 | 0.05161 | 0.04892 | 1.94 | 2.07 |
| | Tc90 | 0.06350 | 0.06874 | 8.06 | 8.62 |
| | MH | 1.44884 | 0.93320 | 1.27 | 1.96 |
| Mooney Viscosity | | 1.93587 | 2.35968 | 2.02225 | 1.62500 |
| Tensile | | 93.939135 | 125.01648 | 1.95 | 1.47 |
| | Base Polymer | NBR**** | | | |
| | Cure System | No Cure | | | |
| Mooney Viscosity | | 2.49259 | 3.26785 | 1.16025 | 0.81600 |

*MI = Minimum Torque; Ts2 = Time for torque to reach 2 in.lbs; Ts90 = time to reach 90% of total cure; MH = Maximum Torque.
**EDPM = ethylene-propylene-diene monomer copolymer
***CPE = chlorosulfonated polyethylene
****NBR = acrylonitrile butadiene rubber

TABLE 6

| | Base | | | | | | | |
|---|---|---|---|---|---|---|---|---|
| | Natural Rubber | | NBR* | | EPDM** | | CPE*** | |
| | Cure | | | | | | | |
| | Sulfur | | Sulfur | | Sulfur | | Sulfurless | |
| | Std. Dev. | CP | Std. Dev. | CP | Std. Dev. | CP | Std. Dev. | CP |
| Rheo MI | ↓ | ↑ | ↓ | ↑ | ↓ | ↑ | ↑/↓ | ↓/↑ |
| Ts2 | ↓ | ↑ | ↓ | ↑ | ↓ | ↑ | ↓/↓ | ↓/↑ |
| Ts90 | ↑ | ↓ | ↑ | ↑ | ↓ | ↑ | ↓/↑ | ↑/↓ |
| MH | ↓ | ↑ | ↓ | ↑ | ↓ | ↑ | ↓/↑ | ↑/↓ |
| Mooney | ↑ | ↓ | ↑ | ↓ | ↓ | ↑ | ↓/↓ | ↑/↑ |
| Mooney | ↓ | ↑ | ND**** | ND | ↓ | ↑ | ND | ND |
| Tensile | ↓ | ↑ | ↑ | ↓ | ↑ | ↓ | ND/↓ | ND/↑ |

*NBR = acrylonitrile butadiene rubber
**EDPM = ethylene-propylene-diene monomer copolymer
***CPE = chlorosulfonated polyethylene
****ND = not done

I claim:

1. A system for controlling the mixing of a composition comprising a polymeric material and additive materials in an internal mixer having at least one variable speed mixing rotor mounted for rotation in a mixing chamber, and a ram mounted for sliding movement in a passage opening into the mixing chamber by which a variable pressure can be applied to materials in the mixing chamber, and a mixer control for controlling the rotor speed and the ram pressure, the system comprising:

a predetermined real time batch temperature profile comprising real time maximum and minimum acceptable temperatures versus mixing times, such that the profile provides a range of acceptable real time temperatures for mixing a batch of the composition;

a temperature sensor for continuous real-time measurement of the temperature of a batch of the composition in the mixing chamber during a mixing cycle, the temperature sensor being in electronic communication with a process control system for transmitting in real time a value to the process control system representing the instantaneous batch temperature; and the process control system in electronic communication with the mixer control and the temperature sensor, the process control system comprising a program for storing the predetermined real time batch temperature profile, for receiving and comparing the instantaneous batch temperature value to the real time acceptable temperature range, for indicating an acceptable temperature when the received real time batch temperature value falls within the acceptable range, and for signaling the mixer control to change at least one of the rotor speed and the ram pressure when the received real time batch temperature value falls outside the maximum or minimum acceptable temperatures for a predetermined period of time.

2. A process for controlling the mixing of a composition comprising a polymeric material and additive materials in an internal mixer having at least one variable speed mixing rotor mounted for rotation in a mixing chamber, and a ram mounted for sliding movement in a passage opening into the mixing chamber by which a variable pressure can be applied to materials in the mixing chamber, and a mixer control for controlling the rotor speed and the ram pressure, the process comprising:

(a) providing a predetermined real time batch temperature profile comprising real time maximum and minimum acceptable temperatures versus mixing times, such that the profile provides a range of acceptable real time temperatures for mixing a batch of the composition;

(b) providing a process control system in electronic communication with the mixer control and with a temperature sensor, wherein the temperature sensor senses the real time temperature of the batch in the mixing chamber and transmits an electronic signal representing the batch temperature to the process control system, the process control system being programmed to store the predetermined real time batch temperature profile and to compare the real time batch temperature with the range of acceptable real time batch temperatures;

(c) introducing each of the polymeric and additive materials to be mixed as the batch into the mixing chamber at appropriate intervals after the start of a mixing cycle; and (d) initiating a control stage at a predetermined time during the mixing cycle, the control stage comprising:

(1) continuously sensing the batch temperature in real time;

(2) continuously transmitting the electronic signal representing the sensed real time batch temperature value to the process control system;

(3) continuously comparing the sensed batch temperature with the predetermined acceptable temperature range; and (4) controlling the batch temperature in real time by electronically signaling the mixer control to change at least one of the rotor speed and the ram pressure when the batch temperature falls outside the maximum or the minimum temperature for a predetermined period of time.

3. A process for controlling the mixing of a composition comprising a polymeric material and additive materials forming a batch in an internal mixer having at least one variable speed mixing rotor mounted for rotation in a mixing chamber, and a ram mounted for sliding movement in a passage opening into the mixing chamber by which a variable pressure can be applied to materials in the mixing chamber, a mixer control for controlling the rotor speed and the ram pressure, and a temperature sensor in the mixing chamber for sensing the batch temperature, the process comprising:

(a) mixing a selected number of experimental batches of the composition;

(b) during mixing of each of the experimental batches, monitoring the temperature in the mixer in real time and providing a real time temperature profile of the temperature versus the time of mixing;

(c) after mixing is completed, determining the quality of the mixing by assessing a physical property of each composition;

(d) selecting temperature profiles for compositions having an acceptable mixing quality;

(e) programming a process control system with the selected temperature profiles to provide a stored predetermined temperature range of allowable real time batch temperature values during the mixing cycle;

(f) mixing a batch of the composition subsequent to the experimental batches using the process control system, comprising the steps of:

(1) continuously sensing the temperature of the batch in the mixing chamber in real time during the mixing cycle;

(2) continuously transmitting an electronic signal representing the sensed real time temperature value from the temperature sensor to the process control system; and (3) controlling the temperature in real time during the mixing cycle, wherein the process control system is in electronic communication with the mixer control and with the temperature sensor for receiving the transmitted temperature value; and wherein the process control system is programmed to receive the electronic signal representing the real time temperature value and to compare the received temperature value to the stored reference temperature range; the process control system is further programmed to indicate an acceptable temperature when the received temperature value falls within the reference range; and the process control system is further programmed to signal the mixer control to change at least one of the rotor speed and the ram pressure when the received temperature value falls outside the reference temperature range for a predetermined period of time.

4. The process of claim 3, wherein the physical property is selected from the group consisting essentially of rheometric properties, filler dispersion, viscosity, percentage cure, tensile strength, and combinations thereof.

5. The process of claim 3, wherein step (e) further comprises the steps of averaging the selected temperature profiles to provide an average real time temperature profile, and selecting predetermined maximum and minimum deviations from the average to provide the maximum and minimum tolerance limits of the predetermined range of temperatures.

6. A process for controlling the mixing of a composition comprising a polymeric material and additive materials forming a batch in an internal mixer having at least one variable speed mixing rotor mounted for rotation in a mixing chamber, and a ram mounted for sliding movement in a passage opening into the mixing chamber by which a variable pressure can be applied to materials in the mixing chamber, a mixer control for controlling the rotor speed and the ram pressure, and a temperature sensor in the mixing chamber for sensing the batch temperature, the process comprising:

(a) mixing a selected number of batches of the composition;

(b) during mixing of each of the batches, monitoring the temperature in the mixer in real time and providing a real time temperature profile of the temperature versus the time of mixing to provide a plurality of batch temperature profiles;

(c) superimposing the plurality of batch temperature profiles to provide a temperature profile trace;

(d) establishing real time maximum and minimum acceptable temperatures from the trace;

(e) programming a process control system with the real time maximum and minimum acceptable temperatures to provide a stored predetermined temperature range of allowable real time batch temperature values during the mixing cycle;

(f) mixing a batch of the composition subsequent to the previous batches using the process control system, comprising the steps of:

(1) continuously sensing the temperature of the batch in the mixing chamber in real time during the mixing cycle;

(2) continuously transmitting an electronic signal representing the sensed real time temperature value from the temperature sensor to the process control system; and (3) controlling the temperature in real time during the mixing cycle, wherein the process control system is in electronic communication with the mixer control and with the temperature sensor for receiving the transmitted temperature value; and wherein the process control system is programmed to receive the electronic signal representing the real time temperature value and to compare the received temperature value to the stored reference temperature range; the process control system is further programmed to indicate an acceptable temperature when the received temperature value falls within the reference range; and the process control system is further programmed to signal the mixer control to change at least one of the rotor speed and the ram pressure when the received temperature value falls outside the reference temperature range for a predetermined period of time.

* * * * *